US007897177B2

(12) United States Patent
Hessel et al.

(10) Patent No.: US 7,897,177 B2
(45) Date of Patent: Mar. 1, 2011

(54) PARTICULATE FIBRE COMPOSITION

(75) Inventors: Lasse L. Hessel, Svendborg (DK); Jesper Malling, Svendborg (DK); Eivind Gudmand-Høyer, Vedbaek (DK)

(73) Assignee: Medic House Cambrige Ltd, Cambridge (GB)

( * ) Notice: Subject to any disclaimer, the term of this patent is extended or adjusted under 35 U.S.C. 154(b) by 1094 days.

(21) Appl. No.: 10/968,570

(22) Filed: Oct. 19, 2004

(65) Prior Publication Data

US 2005/0112242 A1 May 26, 2005

Related U.S. Application Data

(63) Continuation of application No. 09/979,359, filed as application No. PCT/DK00/00307 on Jun. 2, 2000, now abandoned.

(30) Foreign Application Priority Data

Jun. 7, 1999 (DK) .................................. 1999 00801
Jun. 6, 2000 (DK) .................................. 2000 00875

(51) Int. Cl.
*A61K 47/00* (2006.01)
*A61K 9/14* (2006.01)
*A61K 9/16* (2006.01)
*A61K 9/50* (2006.01)
*A23L 1/216* (2006.01)

(52) U.S. Cl. ......... 424/489; 424/439; 424/490; 424/493; 424/496; 426/96

(58) Field of Classification Search ........................ None
See application file for complete search history.

(56) References Cited

U.S. PATENT DOCUMENTS 4,166,134 A * 8/1979 Witzel et al. ...................... 426/3
4,565,702 A 1/1986 Morley et al.
4,619,831 A 10/1986 Sharma (Continued)

FOREIGN PATENT DOCUMENTS

EP 0166824 1/1986

(Continued)

OTHER PUBLICATIONS

Ray et al. American Journal of Clinical Nutrition1983 37:376-381.*

(Continued)

*Primary Examiner* — Juliet C Switzer
*Assistant Examiner* — Caralynne Helm
(74) *Attorney, Agent, or Firm* — Licata & Tyrrell P.C.

(57) ABSTRACT

A particulate fiber composition containing at least one first dietary fiber, coated by an insoluble dietary fiber or a dietary fiber with low solubility, serving to prevent dissolution of the fiber composition in the oral cavity and during passage through the esophagus. The fiber composition has one or several inserted additional layers of at least one second dietary fiber between the at least one first dietary fiber and the coating of the insoluble dietary fiber/dietary fiber of low solubility. The different properties of solubility and fermentability of the fibers are utilized for the production of multi-layer particles. The dietary fiber composition can be used as a supplement applied in pharmaceuticals and food products where high fiber content and small calorie content is given a high priority. Furthermore, the dietary fiber supplement can be applied for replacement of part of the sugar in sugar coatings of generally known cereals.

12 Claims, 4 Drawing Sheets

Figure 1:
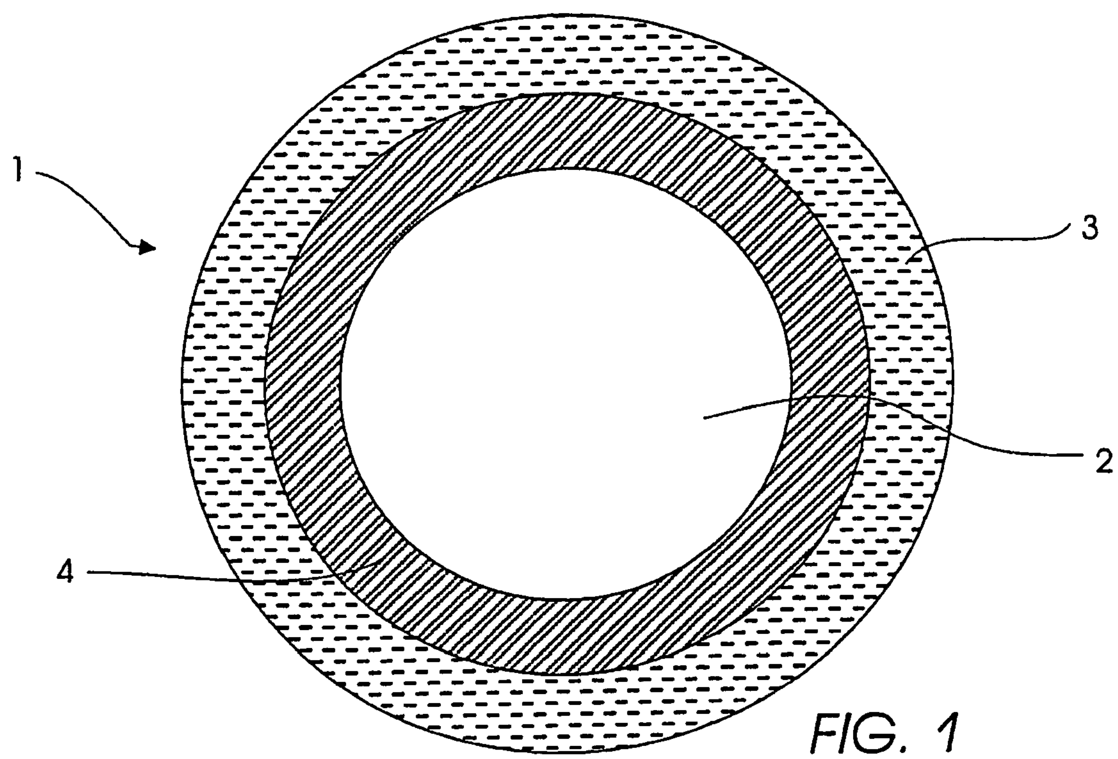

1
3
2
4

U.S. PATENT DOCUMENTS

| | | | | |
|---|---|---|---|---|
| 4,927,649 A | | 5/1990 | Antenucci | |
| 5,189,148 A | * | 2/1993 | Akiyama et al. | 530/399 |
| 5,466,469 A | * | 11/1995 | Kuhrts | 424/451 |
| 5,972,399 A | * | 10/1999 | Lapre et al. | 426/302 |
| 6,149,965 A | * | 11/2000 | van Lengerich et al. | 426/620 |
| 6,531,152 B1 | * | 3/2003 | Lerner et al. | 424/464 |

FOREIGN PATENT DOCUMENTS

| | | |
|---|---|---|
| EP | 0166825 | 1/1986 |
| JP | 2983716 | 8/1993 |
| JP | 6015163 | 4/1994 |
| WO | WO 9506417 | 3/1995 |

OTHER PUBLICATIONS

Gelissen et al. American Journal of Clinical Nutrition 1994 59:395-400.*

Onsøyen, E. 1996. "Commercial applications of alginates." Carbohydr. Eur. 14:26-31.

World Health Organization, "Compendium of Food Additive Specifications. Addendum 5." Food and Agriculture Organization of the United Nations Food and Nutrition Paper—52 Add. 5. (1997).

* cited by examiner

PARTICULATE FIBRE COMPOSITION

CROSS-REFERENCE TO RELATED APPLICATIONS

This application is a continuation of Application No. 09/979,359 filed Nov. 21, 2001, now abandoned, which in turn is the U.S. national stage application of International Application PCT/DK00/00307, filed Jun. 2, 2000, which international application was published on December 2000 as International Publication WO 00/74501 in the English language. The International Application claims priority of Denmark Patent Application No. PA 1999 00801 filed Jun. 7, 1999 and Denmark Patent Application No. PA 2000 00875 filed Jun. 6, 2000.

The invention relates to a particulate fibre composition of such type containing at least one first dietary fibre surrounded by an insoluble dietary fibre or a dietary fibre of low solubility serving to prevent dissolution of the fibre composition in the oral cavity as well as during passage through the oesophagus.

In recent years, ready-made food has become an increasing part of the diet. As little as 50 years ago, the quantity of fibres in the diet was approximately 5 times higher than in today's Western World diets. This gradual change of food habits and the increased level of welfare, particularly in the Western World, has resulted in an increasing number of persons with diseases such as diabetes mellitus, gastrointestinal diseases, obesity, constipation, hiatal hernia, cardiovascular diseases, intestinal polyps, arteriosclerosis and colon cancer and rectal cancer as well as ordinary digestive trouble.

So far, it is a well-known fact that a diet containing sufficient quantities of fibres facilitates the support of normal healthy body functions, thus decreasing the number of gastrointestinal diseases considerably.

Natural vegetable fibres are high-molecular polymers that form part of the vegetable cell wall such as e.g. cellulose, hemicellulose, pectin, etc. Vegetable fibres are indigestible or digest slowly in human beings. Consequently, no calories or a very small amount of calories are added to the food. Fibres are known to be a valuable contribution to the food, as they contain e.g. anti-oxidants and vitamins.

The vegetable fibres become voluminous at contact with liquid, resulting in a sense of satiety and reducing the desire for further intake of food. When the fibres absorb liquid, the vegetable fibres act as a lubricant for the passage of food through the alimentary canal, thus protecting the mucosa. Hence, intake of food with high fibre content offers the possibility of adjusting digestion and reducing calorie intake.

Attempts to utilize this knowledge in various ways are made, e.g. by ingestion of unprocessed fibres directly via the food or as a dietary supplement, or ingestion of more or less processed fibres. Frequently, however, the taste of unprocessed fibres is very unpleasant. The mouthfeel becomes sticky when the fibres swell and consequently they are very difficult to swallow. Hence, unprocessed fibres are extremely difficult to ingest and their useful effect difficult to utilize.

U.S. Pat. No. 4,619,831 discloses a composition of dietary fibres produced by coating an insoluble fibre with an easily soluble fibre. The insoluble fibre is chemically and enzymatically purified to provide a concentration of insoluble dietary fibre. Subsequently, the concentrated fibre is encapsulated in an easily soluble fibre. Easily soluble vegetable fibres are inclined to absorb liquid. They therefore dissolve at the first contact with liquid, e.g. water, and the insoluble vegetable fibres will quickly begin to swell. When e.g. the humidity of air is absorbed, the nutritional supplement will gradually become soft and spongy and may offer favourable conditions of growth for microbial activity, hence a poor durability of the dietary fibre composition; on top of that, the vegetable fibres expand quickly. Such disadvantages make heavy demands on storage facilities and reduce the applications of the product.

Another disadvantage is created when the composition of dietary fibres is consumed together with food, in as much as the fibres begin to swell at the first contact with saliva in the oral cavity. Such swelling quickly causes the fibres to grow to such a considerable degree that it gives an unpleasant sensation when the person swallows the food. Possible utilization of fibres in colon cannot be monitored.

Japanese patent application JP 6015163 discloses microcapsules or pearls comprising fibres or drugs released at controllable speed. To prevent decomposition of the microcapsules while standing in strong saline solutions, the capsules contain alginic acid fibres or an alginic acid salt. The microcapsules are furthermore characterized by good physical stress properties.

Such microcapsules are produced by mixing a sodium alginate solution with another substance, e.g. a fibre. The compound is shaped into pearls and after a fall from a height of 5 cm into a calcium chloride solution, it is subjected to subsequent drying.

The microcapsules comprise only two fibres. The capsules are produced in such a way that the previous mixing of the fibres will not cause a complete surrounding of the remaining substance by fibres of alginic acid or alginic acid salt. Hence, it will be liberated gradually to the surroundings as early as at the first contact with a liquid. Furthermore, the design of the microcapsules is stress-proof which make them extremely unpleasant to chew.

The energy content of vegetable fibres is very low and utilization involves some difficulties. However, particularly water-soluble vegetable fibres are more or less fermentable, although such process involves considerable energy consumption.

It has only recently become known within technical science that fibres are combined of various components, the result of which is that different fibres have individual compositions which however only have been identified in very few cases. As an example, the effect of water-soluble dietary fibres of e.g. fruits, oat and legumes on the content of glucose and cholesterol in the blood is known today.

Generated through own experiments, the inventors of this invention have now succeeded in applying this new know-how for the manufacture of a number of various fibre compositions with unique positive effect on health as well as applications so far unknown.

The object of the invention is to provide a particulate fibre composition of the kind mentioned in the opening paragraph, which is applicable for preventive treatment of diseases, for direct treatment of diseases, or for consumption as a beneficial dietary supplement without essential change of eating habits.

A second object of the invention is the making of a particulate fibre composition for adjustment of the retention time of food in one or several sections of the gastrointestinal tract.

A third object of the invention is to provide a multilayer particulate fibre composition, each layer having its own unique effect on or in a previously identified spot in the gastrointestinal tract.

A fourth object of the invention is to provide a fibre composition rich in fibre and low in carbohydrate.

A fifth object of the invention is to provide a method to produce such particulate fibre composition.

The novel and unique features, whereby this is achieved according to the invention, is the insertion of one or several additional layers of at least one other dietary fibre between the at least one first dietary fibre and the coating of the insoluble/slightly soluble dietary fibre.

Insoluble and soluble dietary fibres will absorb liquid at contact. To prevent dissolution and swelling of fibres e.g. already during storage of the finished product or immediately after initial fibre intake, the fibres may be encapsulated in at least one vegetable fibre coating which has insolubility or slight solubility by nature or through processing.

Production of compositions of fibre combinations with numerous therapeutic and/or healthful possibilities and effects is rendered possible by structuring the particulate fibre composition of layers of different fibres.

The fibre composition is made up of several different fibres, thus according to the invention enabling the design of a particulate fibre composition, partly consisting of fibres whose properties allow the conveyance of one or several fibres to one or several prefixed spots in the gastrointestinal tract, partly consisting of fibres whose purpose is to act in such spots.

By using the fact e.g. that various insoluble fibres or fibres with low solubility are more or less dissolved at various rates and at various pH values, it is possible to apply such fibres for encapsulation of other components such as easily soluble fibres that are fermented in colon, or fibres with low solubility that swell and fill the stomach for a prolonged period of time before passing on in the system.

Other advantageous effects may be e.g. swelling to increase the sense of satiety, to release vitamins and to adjust transit time through the gastrointestinal tract. In addition, there is by fermentation generated acetate supplying energy to the organism (corresponding to approx. 50% carbohydrate), butyrate directly nourishing epithelial cells in colon, and propionate supposedly reducing the content of cholesterol in the blood.

In addition, the soluble fermentable fibres change the bowel flora in colon in such a way that the quantity of bifido bacteria is increased to the detriment of bacteria such as *Clostridium, Escherichia coli* and *Klebsiella*. It is a well-known fact that bifido bacteria reduce certain initial stages and markers of colon cancer and reduce the risk of gastrointestinal infections as well as various infections in the bowel, e.g. Crohn's disease and ulcerative colitis.

The particulate fibre composition can advantageously comprise one or several inserted layers of fibres designed to gradually dissolve and/or be released and/or be fermented in the course of conveyance of the fibre composition through the gastrointestinal tract and its stay in the various sections such as the stomach, the jejunum, the duodenum, the ileum or the colon.

A preferred embodiment of the invention may include at least one first dietary fibre in the fibre composition, accounting for between 65% and 98% of the total fibre content of the fibre composition, and this fibre can advantageously be selected as the fibre required to be conveyed to and utilized in the desired part of the gastrointestinal tract.

The outermost layer of fibre can advantageously be selected as a fibre which does not dissolve until at contact with the gastric juice. When the fibre composition is encapsulated by such a layer of insoluble fibres or fibres of low solubility, the coating will form a protective barrier against absorption and penetration of humidity from the surroundings to the inner layers of fibre. Consequently, the durability and retention time of the packed fibre composition can advantageously be increased, and the costs of expensive packing techniques and storage conditions be kept down.

At the same time, the advantage is obtained in that the fibre composition will not begin to swell on ingestion, but gradually be dissolved on the desired spot in the stomach or the intestine. Consequently, it is far more pleasant to eat than e.g. unprocessed fibres of e.g. wheat bran or psyllium. As previously mentioned, such are very difficult to swallow and give an unpleasant, sticky sensation in the mouth.

A particularly advantageous embodiment of the invention offers an outermost coating to the fibre composition, e.g. containing a natural colouring agent to give the composition an attractive appearance. Alternatively, the coating may be a thin natural layer of fibres, sweet to the taste, such as inulin or Raftilose. This makes appearance, taste and texture of the fibre composition attractive to e.g. children for eating on e.g. sour-milk products which children typically eat for breakfast.

Inulin is not hydrolyzed by enzymes in the gastrointestinal tract and therefore presents no metabolisable carbohydrate source. Consequently, it is excreted in a non-metabolised manner.

In cases where the only sweetener of the fibre composition is a non-decomposable dietary fibre, the fibre composition is also an attractive dietary supplement for diabetes patients.

Alternatively, an outer layer of the fibre composition may be either a glazing or a coating of a monosaccharide such as fructose, glucose or sucrose, adding a pleasantly sweet taste with a prompt taste sensation to the fibre composition and making it even easier to swallow.

Additionally, the fibre composition may have one or several inserted layers or an outermost coating of a protein, such as casein containing all normal amino acids as well as a beneficially large number of the essential amino acids.

The at least one first dietary fibre is preferably selected from the group of psyllium, citrus pulp, apple pulp, black currant pulp, cherry pulp, grape pulp, modified starch, wheat bran, cellulose, acacia gum, alginate and fibres from pulp originating from other vegetables and fruits. However, this invention is not limited to such dietary fibres in as much as other types of fibres will be within the scope of this invention.

Furthermore, similar encapsulation of other nutritive components in fibres will also be possible.

As example of the fibre content in pulp, it can be mentioned that apple pulp from production of apple juice analysed to have a dietary fibre content of approximately 58 per cent, of this approximately 25 per cent is raw cellulose; the pulp from production of black-currant juice analysed a dietary fibre content of approximately 65 per cent, of this approximately 25 per cent is raw cellulose; and pulp from production of cherry juice analysed a dietary fibre content of approximately 60%, of this approximately 23 per cent is raw cellulose.

Such residual or side products from juice production are a low-priced raw material, containing minerals and vitamins and being particularly well suited for adjustment of the dietary fibre content of food. Frequently, such residual or side products are waste products which are removed either by expensive disposing or by incineration. Consequently, such products are advantageously low-priced and useful ingredients of the fibre composition according to this invention.

When the dietary fibres come from industest residual products, prior ultrasound processing may be advantageous, e.g. 15-40 kHz, partly to give raw material containing vegetable fibres, such as pulp and pulp fibres from vegetables and fruits, a larger surface, and partly to ensure that the natural germs on pulp and fibres are completely destroyed.

The at least one other dietary fibre can advantageously be selected from the fibre group consisting of pectin, guar gum, acacia gum, dextran, inulin, Raftilose, alginic acid, alginate, mainly K-alginate or Ca-alginate, or combinations of these.

In a preferred embodiment the at least one first dietary fibre is encapsulated in a coating of K-alginate or a coating of Ca-alginate, the insolubility of such combinations at neutral pH value being well-known to the expert, or that the combinations can easily be processed with a view to becoming insoluble at neutral pH value. (Edvar Onsøyen, Commercial applications of alginates, Carbohydrates in Europe No. 14, May 1996, pp. 26-31). The combinations are very robust against exposure to liquid and do not dissolve until exposure to a liquid with a low pH number, e.g. when exposed to the hydrochloric acid of the stomach. Such coating may also act as an inserted dietary fibre layer.

Alternatively, the encapsulating coating or one or several of the inserted dietary fibre layers may be a combination of K-alginate, Ca-alginate or pectin.

In addition, the fibre composition may include at least one additive, comprising between 0.1 and 5 per cent of the total weight of the finished fibre composition. Such additive has been selected from the fibre group with non-oxidizing properties such as tomatoes and grapes, vitamins, colouring agents, flavouring agents or from the group of sweeteners with low caloric content, mainly from the group of inulin, neohesperidine and steviolglycosides. Steviolglycoside sweetens up to 300 times more per weight unit and neohesperidine up to 1500 times more per weight unit compared to sucrose which makes this group of sweeteners highly applicable to keep the dietary supplement low in caloric content.

In an alternative embodiment, an additive with anti-oxidizing properties may be added to the particulate fibre composition. Examples of such additives may be synthetic or natural vitamins such as vitamin C or E.

The durability of the finished product will be further ensured by addition of anti-oxidants, or if an essential part of the fibre composition consists of fibres with anti-oxidizing effect. Furthermore, this produces a good effect on the fibre composition in as much as anti-oxidants inhibit the formation of free oxygen radicals, thus producing an anti-inflammatory effect as well as preventing cardiovascular diseases.

For adjustment of the relation between the fibre content of the fibre and the volume of the finished product, the fibre composition may advantageously additionally include at least one filler, preferably from the group of guar gum, starch, maltodextrin or their breakdown products and/or derivations. In addition, such filler makes for the unification of fibres.

Lucrative applications of this fibre composition may be addition to or coating of corn products, bread, health bars and similar products in as much as addition of the composition will not affect the normal characteristics of the end product.

In addition, the invention relates to a method for producing a particulate fibre composition as described above.

The method may include one or several of the following steps:

- solution/suspension of the at least one first dietary fibre in water,
- filtration of the solution/suspension of the at least one first dietary fibre through a filter with a fixed mesh size preferably not exceeding 0.2 mm,
- evaporation of fibres to dryness,
- trituration of evaporized fibre paste to a particulate fibre substance with a particle size preferably not exceeding 0.2 mm,
- coating of the particulate fibre substance with one or several layers of a second dietary fibre, and
- drying of the resultant particulate fibre composition at approximately 60° C.

If the fibres originate from industest production of e.g. juice, such fibres may produce an undesired microbiological activity. In such cases, the method may advantageously include an initial step where the fibres are ultrasound processed for a period sufficiently long to inactivate microbiological activity. The fibres may further be autoclaved to obtain optimum guarantee for elimination of all germs.

Furthermore, it may be appropriate to treat the evaporized fibres with a solution containing cation, such as $CaCl_2$, to crosslink and unify the fibres in the fibre composition. To reduce drying time and production time it may be appropriate to apply a $CaCl_2$ solution with a relatively high concentration, e.g. 5% (5 grams/100 ml).

In an especially preferred embodiment, the method can also include the step of adding sweetener exclusively or together with one or several additives to the nutritional supplement.

When the at least one first dietary fibre and one or several inserted layers of fibre are sprayed and/or coated with a fibre, e.g. an alginate which is insoluble until contact with liquid with a low pH, or pectin which has low solubility at neutral pH, the gelating, coating and stabilising properties of the fibre will cause the fibre to surround the remaining fibres forming a coating, entirely covering the remaining fibre layers.

Furthermore, the invention relates to the application of the fibre composition in food processing, e.g. cereals, cakes, snacks, health bars, healthy candy, drinks as well as health food products in general. Depending on the applied fibres, the energy of such food will be low, as will the optional content of natural or added vitamins, minerals and/or anti-oxidants. The intake of such food products can contribute positively to e.g. adjustment of the cholesterol in the blood stream, adjustment of the uptake of calcium, increase of the number of bifido bacteria in colon as well as adjustment of digestion.

The fibre composition may form part of such food products by way of coating or in the form of added granulates or powders in as much as swelling of the fibre composition is prevented when added to a liquid-containing medium with neutral pH value.

By suspension of the finished particulate fibre composition in an aqueous solution, the suspension can easily be sprayed onto or over any type of cereal, followed by subsequent drying by well-known techniques. In this way, a food product rich in fibre and low in caloric value is produced. Consequently, the fibre composition is extremely suitable for substitution of at least part of the sugar in sugar coatings of generally known cereals. The fibre present in such a cereal comprises as much as 30 w %.

Particularly beneficial applications of fibre compositions according to this invention is in the form of dietary supplements or pharmaceuticals, e.g. for adjustment of emptying time of the stomach, for adjustment of transit time of food through the intestines, for adjustment of calcium uptake by the gastrointestinal tract, for treatment of insulin resistance, lipaemia, obstipation, overweight or infection in the gastrointestinal tract.

Within the scope of this invention, the fibres for the production of the fibre composition may be fermented or synthesised dietary fibres as well.

Within the scope of this invention, the fibre composition may be applied for numerous purposes in food products, dietary products as well as health food products, and is consequently not limited to the above mentioned applications.

Figure 2:
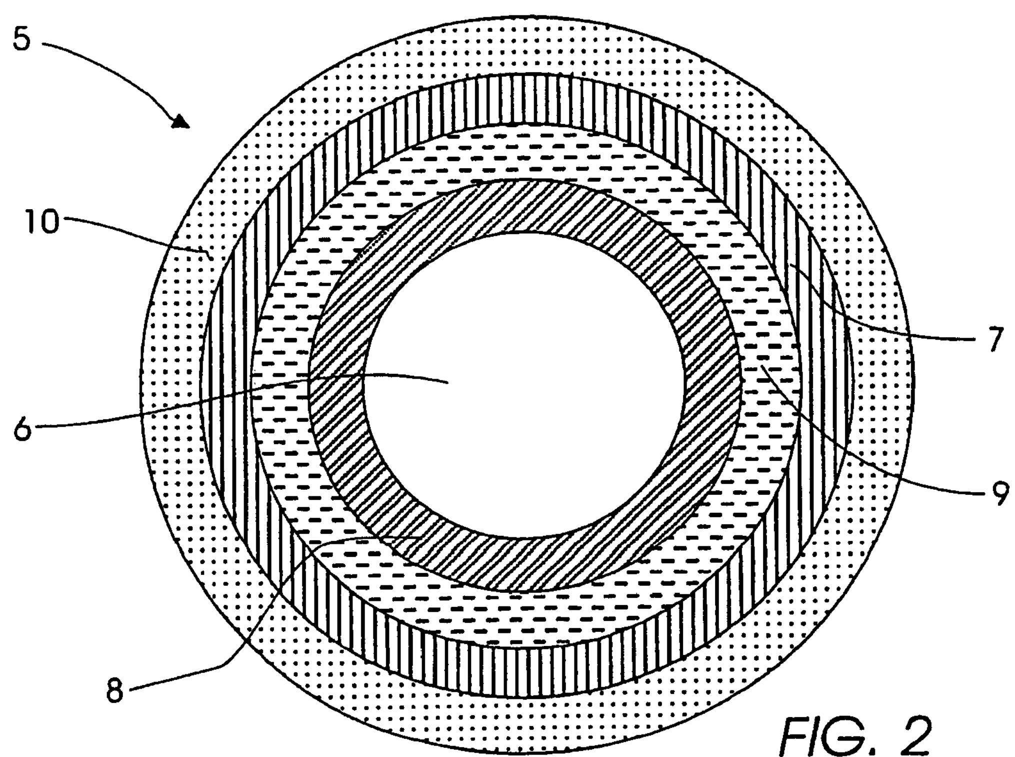
Figure 3:
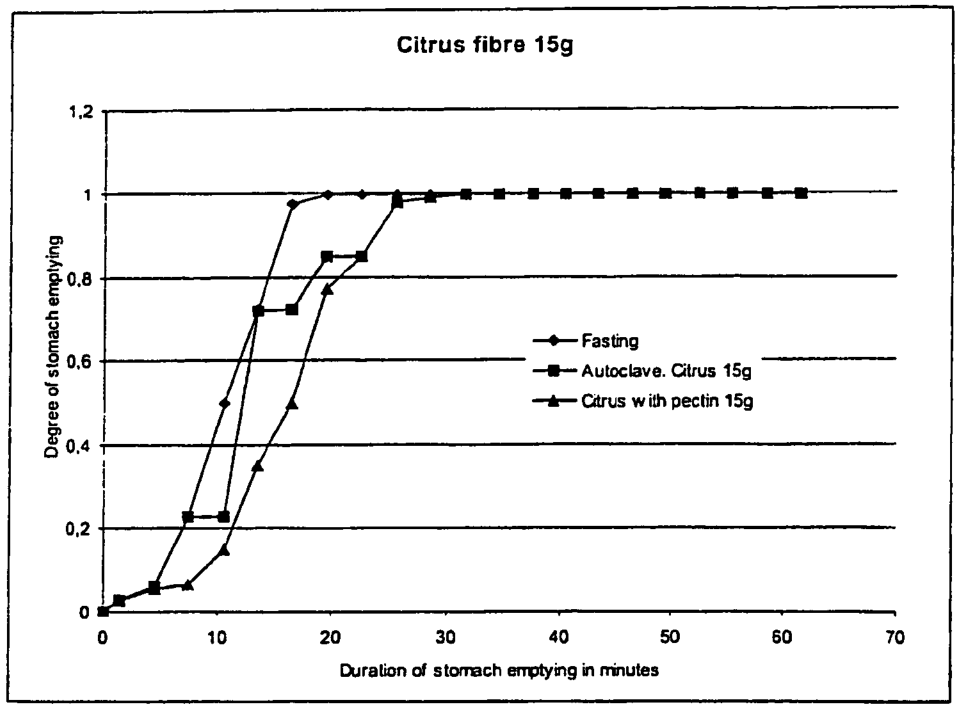
Figure 4:
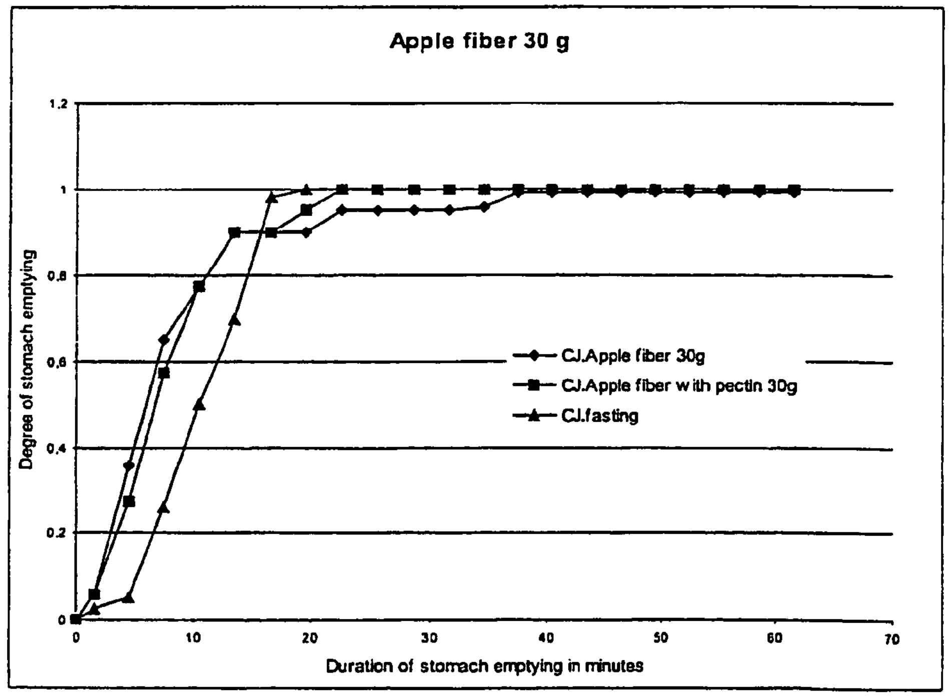
Figure 5:
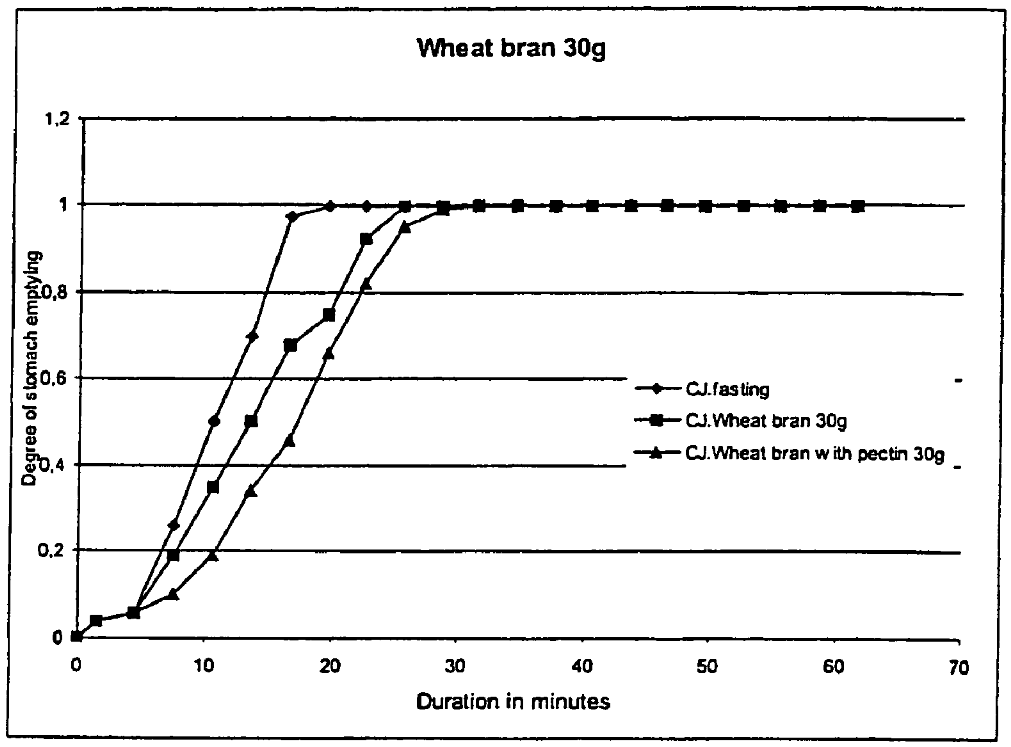
Figure 6:
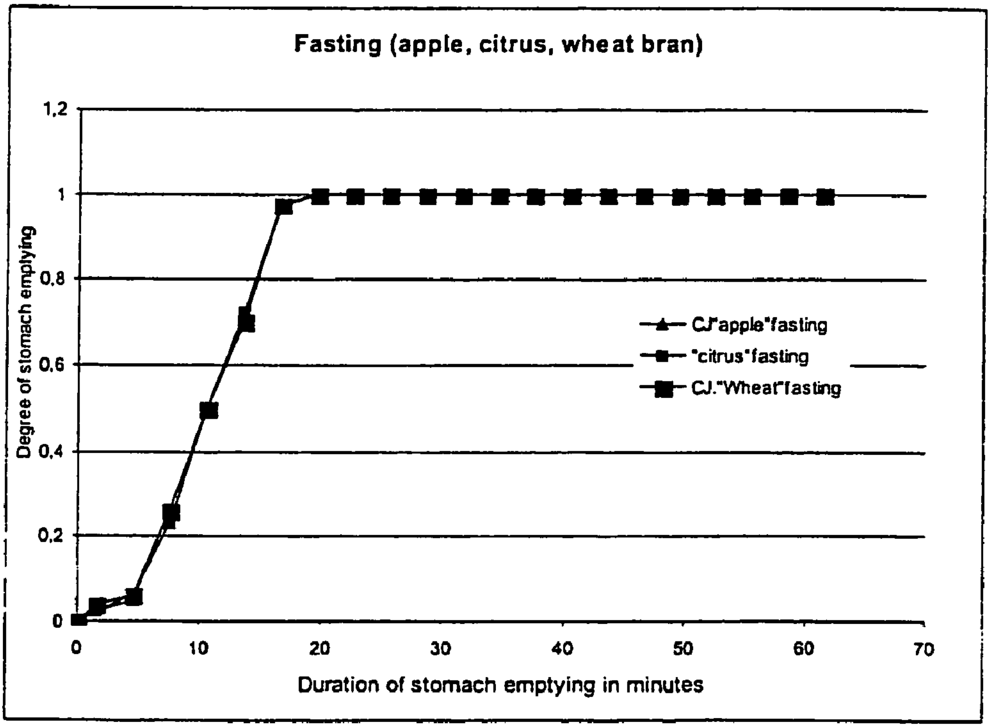
Figure 7:
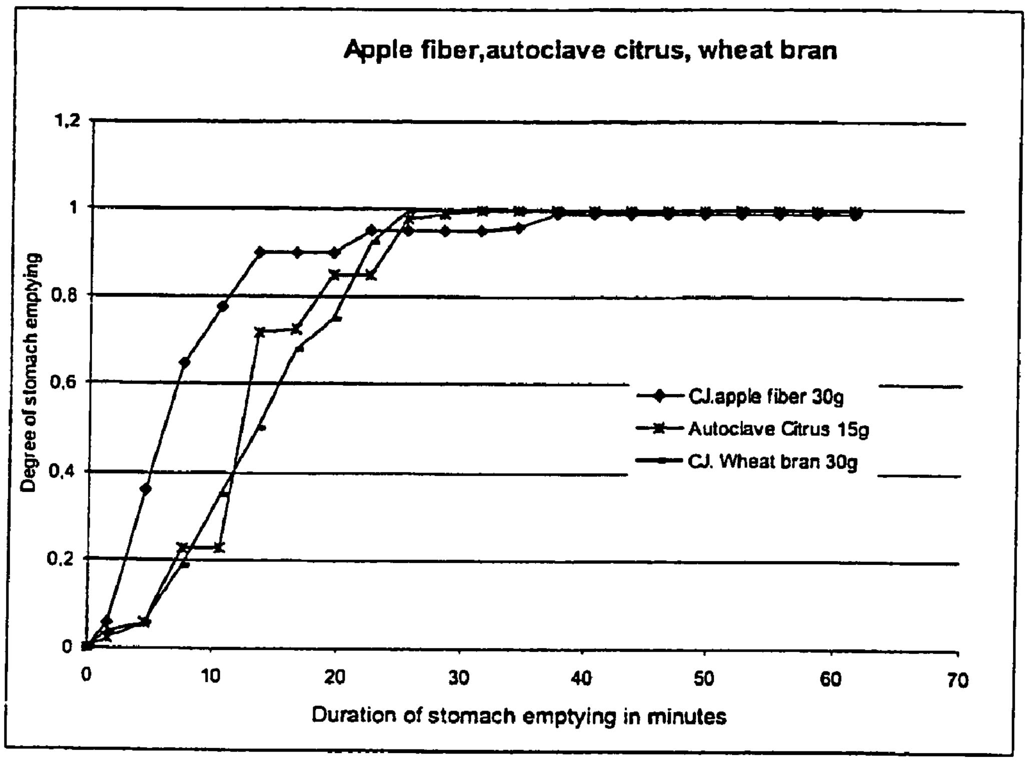
Figure 8:
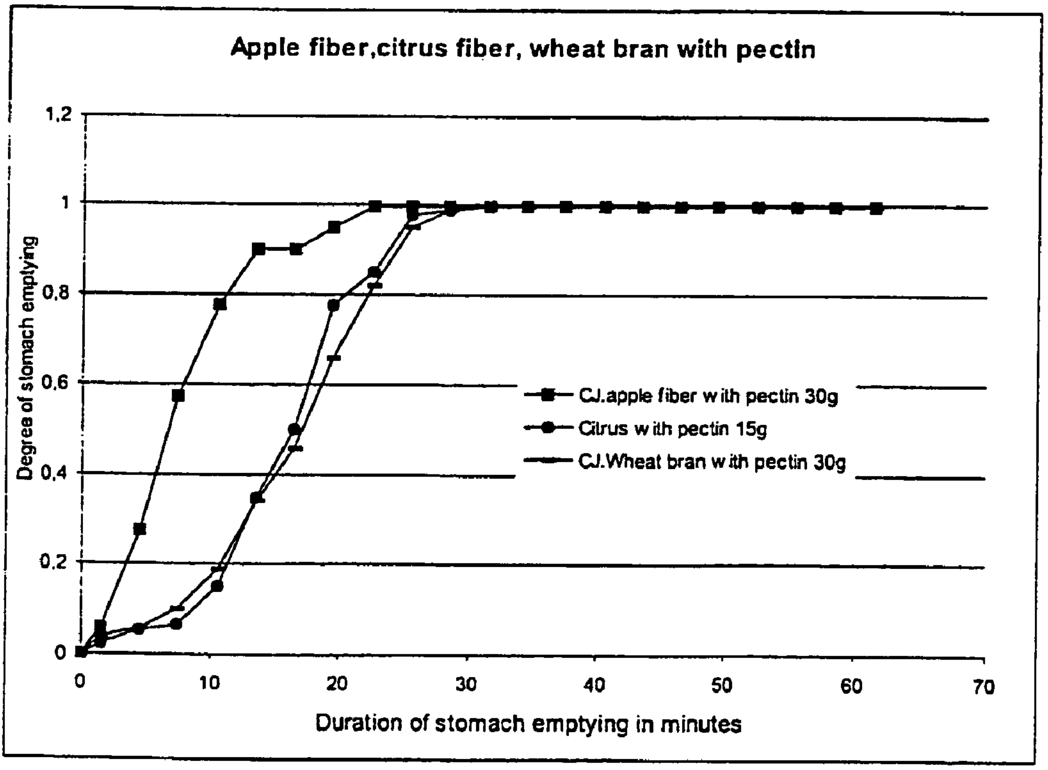

The dietary fibres of the particulate fibre composition may include any combination of various soluble, insoluble, easily fermentable dietary fibres or dietary fibres which are not easily fermentable, and particularly beneficial embodiments will be described in the enclosed examples with reference to the drawing, in which FIG. 1 shows a schematic presentation of an example of an embodiment of a particulate fibre composition according to the invention, FIG. 2 shows a schematic presentation of another example of an embodiment of a particulate fibre composition according to the invention, FIG. 3 shows comparative test results for extent of stomach emptying in terms of the time for ingestion of the particulate fibre composition, presented in test 4 according to the invention, compared to the unprocessed fibres and a blank experiment, FIG. 4 shows the same, but for test 5, FIG. 5 shows the same, but for test 6, FIG. 6 shows schematically a comparison of the test results for extent of stomach emptying in terms of the time for blank experiments in tests 4, 5 and 6, FIG. 7 shows schematically a comparison of the test results for extent of stomach emptying in terms of the time for unprocessed fibres in tests 4, 5 and 6, and FIG. 8 shows schematically a comparison of the test results for extent of stomach emptying in terms of the time with fibres produced in accordance with the invention in tests 4, 5 and 6.

A particle 1 of the particulate fibre composition according to the present invention appears schematically from FIG. 1. The particle includes in this example the first dietary fibre 2 of psyllium, a layer 3 of the dietary fibre inulin with low solubility, entirely encompassing the primary dietary fibre 2, and an inserted layer 4 of a second dietary fibre pectin, entirely encompassing layer 3. A particle 5 of a particulate fibre composition according to the present invention appears schematically from FIG. 2. The first dietary fibre 6 consists of wheat bran, the insoluble layer is a layer 7 of alginate, a first inserted layer 8 encompassing the first dietary fibre 6 consists of psyllium and a second inserted layer 9 encompassing the first inserted layer 8 consists of pectin. In the shown case, the particle has been glazed by a layer of glucose 10.

In the following examples, the coating unit is a rotary mill, type Mansfield Ltd. UK.

$^{13}C$ expiratory test was carried out by ingestion of 150 mg $^{13}C$-marked sodium acetate together with the apportioned quantity of dietary fibres or blind test. The $^{13}C$ content of the expiratory air was measured every third minute for two hours and every fifteenth minute for four hours.

Alternative embodiments of this invention have been produced and tested in the following tests.

EXAMPLES

Test 1:

Production of a Particulate Fibre Composition According to the Invention with One First Dietary Fibre and Two Additional Fibre Layers.

Transfer of 50 grams psyllium to coater and heating to 60° C. Crosslinking of fibres by spraying with 10 ml of a 1% $CaCl_2$ solution for a 60-second period. Drying of fibres by conveyance in coater at 60° C. for 5 minutes. Spraying of the dried crosslinked psyllium fibres with 5 ml 5% pectin solution for 10 minutes. Subsequent drying of the fibre composition by conveyance in coater for additionally 5 minutes at 60° C. Final spraying of the pectin-coated psyllium fibres with 10 ml 10% inulin, and drying of the fibre composition by conveyance in coater for 5 minutes at 60° C.

This fibre composition has a long retention time in the stomach and contains 50 grams of psyllium, 0.1 gram of $CaCl_2$, 0.25 grams of pectin and 1 gram of inulin, giving an end product with a composition of the substance by percentage as follows: 97.37% psyllium, 0.19% $CaCl_2$, 0.49% pectin and 1.95% inulin, based on the final weight of the finished product.

Test 2:

Production of a Particulate Fibre Composition According to the Invention with One First Dietary Fibre and Two Additional Fibre Layers.

As test 1, however 10 ml 5% pectin solution and 20 ml 10% inulin suspension are applied.

This fibre composition has long retention time in the stomach and the content of psyllium results in neutralisation and stabilisation of the blood sugar level at ingestion of the fibre composition. The fibre composition contains 50 grams of psyllium, 0.1 gram of $CaCl_2$, 0.5 grams of pectin and 2 grams of inulin. The composition by percentage of the final product is 95.06% psyllium, 0.19% $CaCl_2$, 0.95% pectin and 3.80% inulin, based on the final weight of the finished product.

Test 3:

Production of a Particulate Fibre Comoosition According to the Invention with One First Dietary Fibre and Two Additional Fibre Layers.

Transfer of 100 grams of psyllium to coater and heating to 60° C. Crosslinking of fibres by spraying with 10 ml of a 1% $CaCl_2$ solution for a 60-second period. Drying of fibres by conveyance in coater at 60° C. for 5 minutes. Spraying of the dried crosslinked psyllium fibres with 25 ml 5% pectin solution for 3 minutes. Subsequent drying of the fibre composition by conveyance in coater for additionally 5 minutes at 60° C. Final spraying of the pectin-coated psyllium fibres with 50 ml 10% Raftilose, and drying of the fibre composition by conveyance in coater for 5 minutes at 60° C.

The organoleptic experience of the testees was that this fibre composition was pleasant to the taste, it was pleasant to consume as well as gave a long sense of satiety. It contains 100 grams of psyllium, 0.1 gram of $CaCl_2$, 1.25 grams of pectin and 5.0 grams of Raftilose, giving an end product with a composition of the substance by percentage as follows: 94.03% psyllium, 0.09% $CaCl_2$, 1.18% pectin and 4.70% Raftilose, based on the final weight of the finished product.

Test 4:

Production of a Particulate Fibre Composition According to the Invention with One First Dietary Fibre of Citrus Pulp and Two Additional Fibre Layers.

Transfer of 500 grams of citrus pulp to 100 ml water and ultrasound-processing for a 15-minute period. Filtration of the fibre composition and autoclave treatment at 112° C. for 10 minutes and drying overnight. Microbiological control in the form of cultivation on nutrient substrate showed no occurrence of germs. Transfer of 250 grams of citrus pulp to coater and heating to 60° C. Crosslinking of fibres by spraying with 25ml of a 1% $CaCl_2$ solution for a 120-second period. Drying of fibres by conveyance in coater at 60° C. for 5 minutes. Spraying of the dried crosslinked citrus pulp with 50 ml 5% pectin solution for 3 minutes. Subsequent drying of the fibre composition by conveyance in coater for additionally 5 minutes at 60° C. Final spraying of the pectin-coated citrus pulp with 50 ml 10% Raftilose, and drying of the fibre composition by additional conveyance in coater for 5 minutes at 60° C.

This fibre composition contains 250 grams of psyllium, 0.25 grams of $CaCl_2$, 2.5 grams of pectin and 5.0 grams of Raftilose, giving an end product with a composition of the substance by percentage as follows: 96.99% psyllium, 0.10% $CaC_21$, 0.97% pectin and 1.94% Raftilose, based on the final weight of the finished product.

For control of the ability of the particulate fibre composition to prevent liquid absorption, 5 grams of unprocessed fibres and 5 grams of the particulate fibre composition according to the invention respectively were transferred to centrifugal bottle containing 50 ml water and agitated for 60 seconds. Subsequent centrifugation at 1000 rpm for 120 seconds and measurement of supernatant. The test was repeated 5 times and showed significantly less absorption of liquid by the particulate fibre composition—up to 77%—compared with unprocessed fibres.

In addition, this fibre composition was applied for the stomach emptying test, shown in FIG. 3. A testee was given 15 grams of water and 15 grams of unprocessed citrus pulp respectively as well as 15 grams of the fibre composition according to the invention for comparison. The rate of stomach emptying was determined by means of $^{13}C$ expiration test and the content of glucose in the blood was monitored.

The test shows that coating of citrus pulp with a pectin layer results in an increase of the half life period for stomach emptying (T/2) by approximately 60%. This fibre composition is rich in vitamins and well suited for prolongation of the sense of satiety. Furthermore, it will contribute to a reduction of the content of cholesterol and triglyceride in the blood. Consequently, it is particularly suitable for reduction of the risk of arteriosclerosis, development of arteriosclerotic heart disease and cerebral haemorrhage.

Test 5:

Production of a Particulate Fibre Composition According to the Invention with One First Dietary Fibre of Apple Pulp and Two Additional Fibre Layers.

Conducted as Test 4, however with apple pulp in stead of citrus pulp.

This fibre composition was applied for the stomach emptying test, shown in FIG. 4. A testee was given 30 grams of water and 30 grams of unprocessed apple pulp respectively and for comparison 30 grams of the fibre composition according to the invention. The rate of stomach emptying was determined by means of $^{13}C$ expiration test and the content of glucose in the blood was monitored.

This test reveals surprising new information and shows that apple pulp single-handedly reduces the rate of stomach emptying, and that coating of apple pulp with a pectin layer results in a reduction in the half life period for stomach emptying (T/2) by approximately 33%. Consequently, this fibre composition is suitable for treatment of persons with problems of too long passage time through the gastrointestinal tract as well as persons suffering from obstipation. Apple pulp is rich in C vitamins. In addition, it is easily fermentable and thus has a positive effect in colon due to stimulation of the generation of bifido bacteria.

Test 6:

Production of a Particulate Fibre Composition According to the Invention with One First Dietary Fibre and Two Additional Fibre Layers.

Conducted as Test 4, however with wheat bran in stead of citrus pulp.

This fibre composition was applied for the stomach emptying test, shown in FIG. 5. A testee was given 30 grams of water and 30 grams of unprocessed wheat bran respectively, and for comparison 30 grams of the fibre composition according to the invention. The rate of stomach emptying was determined by means of $^{13}C$ expiration test and the content of glucose in the blood was monitored.

This fibre composition enables increase of the half life period for stomach emptying by approximately 50%. Consequently, this fibre composition is suitable for prolongation of e.g. the sense of satiety and is well suited as a dietary product as well as a health product.

Test 7:

Production of a Particulate Fibre Composition According to the Invention with Two First Dietary Fibres and Three Additional Fibre Layers.

Dissolution of 1000 grams of psyllium in 1000 ml boiling water and filtration through a filter with mesh size 0.05 mm. Pouring of this compound over 1000 grams of oat bran and evaporation and grinding to particles of less than 0.02mm. Transfer to heated coater (rotary mill). Crosslinking of fibres by spraying with 50 ml of a 5% $CaCl_2$ solution for a 60-second period. Drying of fibres by conveyance in coater at 60° C. for 5 minutes. Spraying of the dried crosslinked fibre composition with 100 ml 3% pectin solution for 10 minutes. Subsequent drying of the fibre composition by conveyance in coater for additionally 5 minutes at 60° C. Spraying of the pectin-coated fibres with 100 ml 5% alginate solution which is insoluble at neutral pH value, and drying of the fibre composition by conveyance in coater for 5 minutes at 60° C. Final coating of the fibre composition with 20 grams of inulin in a 10% solution and drying of the fibre composition by conveyance in coater at 60° C. for 5 minutes.

This fibre composition contains 1000 grams of psyllium, 1000 grams of oat bran, 2.5 grams of $CaCl_2$, 3.0 grams of pectin, 5.0 grams of alginate and 20 grams of inulin, giving an end product with a composition of the substance by percentage as follows: 49.25% psyllium, 49.25% oat bran, 0.12% $CaCl_2$, 0.15% pectin, 0.25% alginate and 0.98% inulin, based on the final weight of the finished product.

The final product is sweet to the taste, is partially soluble in the stomach and contributes to prevention of the rate of stomach emptying by approximately 50%. Psyllium and oat bran is fermented in colon, and ingestion of the fibre composition results in reduced insulin response.

Test 8:

Production of a Particulate Fibre Composition According to the Invention with Two First Dietary Fibres and Three Additional Fibre Layers as Well as an Outer Coating of Glucose.

Production of fibre composition as in Test 7, however with a glucose coating.

This fibre composition has a higher energy content of easily metabolisable monosaccharids, and the outer sweet-tasting layer is pleasant to the taste promptly.

Test 9:

Production of a Simple Fibre Composition According to the Invention with One First Dietary Fibre and One Additional Fibre Layer.

Transfer of 100 grams of psyllium to coater and heating to 60° C. Crosslinking of fibres by spraying with 10 ml of a 1% $CaCl_2$ solution for a 60-second period. Drying of fibres by conveyance in coater at 60° C. for 5 minutes. Spraying of the dried crosslinked psyllium fibres with 25 ml 5% pectin solution for 3 minutes. Subsequent drying of the fibre composition by conveyance in coater for additionally 5 minutes at 60° C.

This fibre composition contains 100 grams of psyllium, 0.1 gram of $CaCl_2$ and 1.25 grams of pectin, giving an end product with a composition of the substance by percentage as follows: 98.67% psyllium, 0.10% $CaCl_2$ and 1.23% pectin, based on the final weight of the finished product.

The invention claimed is:

1. A particulate fiber composition comprising multiple layers of fibers for the conveyance of one or several fibers to one or several prefixed locations in the gastrointestinal tract, said fiber composition at least partly comprised of fibers whose purpose is to act in such locations and comprising at least one first dietary fiber accounting for between 65 and 98% of the weight of the total fiber composition, a coating of a dietary fiber that is insoluble at neutral pH, and at least one second dietary fiber disposed between the at least one first dietary fiber and the coating of dietary fiber, wherein the fibers of the first dietary fiber are cross-linked.

2. A particulate fiber composition according to claim 1, wherein at least one fiber of the particulate fiber composition has a therapeutic effect.

3. A particulate fiber composition according to claim 1, wherein the at least one first dietary fiber is selected from the group consisting of psyllium, citrus pulp, apple pulp, grape pulp, modified starch, wheat bran, oat bran, cellulose, gum arabic, alginate and pulp fibers from vegetables and fruits.

4. A particulate fiber composition according to claim 1, wherein the at least one second dietary fiber is selected from the group consisting of pectin, guar gum, acacia gum, dextran, inulin, inulin-derived oligo-fructan, alginic acid, alginate, and combinations thereof.

5. A particulate fiber composition according to claim 1, further comprising at least one additive selected from the group consisting of fibers with antioxidizing properties, vitamins, coloring agents, flavoring agents and sweeteners with low calorie value.

6. A particulate fiber composition according to claim 5, wherein the at least one additive is a layer of monosaccharides, oligosaccharides or proteins.

7. A particulate fiber composition according to claim 5, wherein the at least one additive is added in a quantity of between 0.1% to 5% by weight of the total fiber composition.

8. A particulate fiber composition according to claim 4, wherein said aliginate is selected from the group consisting of K-alginate, Ca-alginate and combinations thereof.

9. A particulate fiber composition according to claim 5, wherein said sweeteners are selected from the group consisting of inulin, neohesperidine, steviolglycosides and combinations thereof.

10. A particulate fiber composition according to claim 1, wherein said coating of dietary fiber dissolves upon contact with gastric juice.

11. A particulate fiber composition according to claim 1, further including at least one third dietary fiber disposed between the at least one first dietary fiber and the at least one second dietary fiber.

12. A particulate fiber composition according to claim 1, further including at least one third dietary fiber disposed between the at least one second dietary fiber and the coating of dietary fiber.

* * * * *